US007002571B2

(12) United States Patent
Lake et al.

(10) Patent No.: US 7,002,571 B2
(45) Date of Patent: Feb. 21, 2006

(54) GRID-BASED LOOSE OCTREE FOR SPATIAL PARTITIONING

(75) Inventors: Adam T. Lake, Portland, OR (US); Anupreet S. Kalra, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 360 days.

(21) Appl. No.: 10/164,942

(22) Filed: Jun. 4, 2002

(65) Prior Publication Data

US 2003/0227455 A1 Dec. 11, 2003

(51) Int. Cl.
*G06T 17/00* (2006.01)
(52) U.S. Cl. .................................................. 345/420
(58) Field of Classification Search ................ 345/421, 345/420; 382/240
See application file for complete search history.

(56) References Cited

U.S. PATENT DOCUMENTS

2003/0117397 A1 * 6/2003 Hubrecht et al. ........... 345/420

OTHER PUBLICATIONS

Postorder Traversal. National Institute of Standards and Technology. May 2002. http://www.nist.gov/dads/HTML/postordrtrvs.html.*
Data Structures, Algorithms. R. Mukundan. Feb. 2002. http://www.cosc.canterbury.ac.nz/people/mukundan/dsal/BTree.html.*
Daniel Aliaga, et al., "MMR: An Interactive Massive Model Rendering System Using Geometric And Image-Based Acceleration," Symposium on Interactive 3D Graphics, 1999, pp. 199-206 and 237, Atlanta, GA, USA.
Frederic Cazals, et al., "Filtering, Clustering and Hierarchy Construction: A New Solution for Ray-Tracing Complex Scenes," Eurographics, 1995, pp. C-371-C-382, Blackwell Publishers.
Frederic Cazals, et al., "Bucket-Like Space Partitioning Data Structures with Applications to Ray-Tracing," Computational Geometry, 1997, pp. 11-20, Nice, France.
Foley, et al., "Computer Graphics: Principles and Practice in C: 12.6.3 Octrees," 2nd Edition, Jul. 1997, pp. 550-557, Addison-Wesley Longman, Inc., ISBN: 0-201-84840-6.
Henry Fuchs, "On Visible Surface Generation By A Priori Tree Structures," 1980, pp. 124-133.
Alan Fournier, et al., "The Stochastic Modelling of Trees," Graphics Interface '86/ Vision Interface '86, 1986, pp. 1-9, Computer Systems Research Inst., University of Toronto, Ontario.
Andrew S. Glassner, "Space Subvision for Fast Ray Tracing," IEEE CG&A, Oct. 1984, pp. 15-22.
JaaP Suter, "Flipcode: Introduction to Octrees," Apr. 13, 1999, http://www.flipcode.com/tutorials/tut_octrees.shtml, Apr. 23, 2002.

* cited by examiner

*Primary Examiner*—Ulka J. Chauhan
*Assistant Examiner*—Peter-Anthony Pappas
(74) *Attorney, Agent, or Firm*—Steve P. Skabert

(57) ABSTRACT

A technique for spatial partitioning and a data structure for storing references to objects in a scene. A grid-based loose octree (GLOtree) is a data structure that combines advantages of a uniform grid-based subdivision method and an octree-based subdivision method to provide a general purpose spatial partitioning method that works well with both static and dynamic scenes. In a GLOtree, objects are located at lower levels of the tree than in the prior art octree. This allows traversals to search for specific objects to be accomplished more quickly when a starting search level of the GLOtree is predicted. The GLOtree uses loose octree nodes that adapt the sizes of octants to the scene.

15 Claims, 13 Drawing Sheets

GRID-BASED LOOSE OCTREE FOR SPATIAL PARTITIONING

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

1. Field

The present invention relates generally to computer graphics and, more specifically, to spatial partitioning of a two-dimensional (2D) or three-dimensional (3D) scene.

2. Description

In 2D and 3D computer graphics, spatial partitioning typically includes the action of dividing up a space into smaller portions. The space may represent a scene in a world. The portions are sometimes called octants (for 3D), quadrants (for 2D), or gridlets (for 2D or 3D). Subdividing space is usually done during graphics pipeline processing to minimize future computation and to minimize the number of objects sent down the graphics pipeline. For example, if some objects in the scene are not currently visible based on the current camera position, then there is no need to further process these objects. Instead of examining each object submitted into the pipeline, when using spatial partitioning, graphics processing examines only the octants actually containing objects of the scene. For example, entire octants may be removed from further processing consideration if they are outside of the currently visible region of the scene, thus saving the time of transforming, rendering, and rasterizing the polygons of the objects contained in the non-visible octants.

Once a scene is partitioned and all objects in the scene are identified for a particular portion of the space, the results are typically stored in a data structure for subsequent use by graphics processing components (such as a video game engine or an animation generator, for example). This data structure is usually generated after scene creation, but before scene visualization and user interaction with the scene. During scene visualization, it may be necessary to find an object in the scene corresponding to a selected point. Given a point in 2D coordinates (e.g., x, y) or 3D coordinates (e.g., x, y, z), the data structure is typically traversed to find information about the object containing the point.

There are at least several existing techniques and corresponding data structures for spatial partitioning. These include uniform grids (also called regular grids), binary space partitioning (BSP) trees, octrees, and k-d trees. Each technique has its own advantages and disadvantages.

A uniform grid is the simplest spatial partitioning scheme. A grid is uniformly subdivided and superimposed onto the scene. For example, if the space is 10 units by 10 units by 10 units, the space could be partitioned into 1 unit by 1 unit by 1 unit cubes (e.g., octants). Advantages of this technique include predictable and relatively fast speed for traversal of the data structure when there is a reasonably uniform distribution of objects in the scene, and fast speed to insert an object into the scene. One drawback is that dense and sparse areas of the scene are presented with identical subdivision. The consequence is that grid cells in densely populated areas contain a high amount of objects while grid cells in sparse areas are nearly empty. As a result, a uniform grid is efficient only if the scene contents are uniformly distributed. Hence, a uniform grid solution partitions the space poorly and doesn't take into account how objects are placed in the scene. Uniform grids are most suited for dynamic scenes.

A BSP tree is a data structure used when recursively dividing space into pairs of subspaces, each separated by a plane of arbitrary orientation and position. Partitions usually focus on polygons of static objects in the scene. Non-uniform partitioning is accomplished by positioning partition planes depending on where objects are located. The BSP tree is typically not axis-aligned and objects may be split by the partitioning planes. Splitting creates a considerable amount of sub-polygons. This technique is suitable for static scenes. However, for a dynamic scene, the data structure must be reconstructed, which is very time consuming and is inadequate for real-time applications such as a video game or an interactive 3D website.

An octree is a data structure similar to a binary tree, but having a greater number of child nodes per parent node. Whereas a binary tree node typically has two child nodes (e.g., left and right children), an octree node has a specified number of child nodes (such as eight). Each node of the octree represents an octant of the scene. Each octant is sub-divided into a number of sub-octants (e.g., eight). Each node of the data structure contains pointers to the octants contained inside (e.g., a parent node points to child nodes). For 2D scenes, the tree is called a quadtree. For 3D scenes, the tree is a called an octree. Finer subdivision is performed in densely populated areas. If no objects are in an octant, then the octant is not subdivided further. An octree may be uniformly or non-uniformly subdivided, depending on the spatial partitioning algorithm used. The octree hierarchically partitions space up to a specified depth. Octrees provide better overall results than the uniform grid based scheme, but partitioning can be poor if objects lie on partitioning planes. Scene traversal for octrees is more expensive than with uniform grids. The octree adapts slowly to irregular scene structure. Another disadvantage is that partitioning with octrees tends to cluster objects at higher levels of the tree. When traversing the octree in a dynamic scene, tree traversal may be slow due to this high level clustering effect.

A k-d tree is a generalization of a binary tree where k is the dimension of the tree and d stands for dimension. For spatial partitioning, a k-d tree may be used to divide space. For example, each division of space denotes which side of a line (in 2D) or a plane (in 3D) an object may be on. Each time the left side of a line (or plane) or below a line (or plane) is considered, a left node of the k-d tree is examined. Each time the right side (or plane) or above a line (or plane) is considered, a right node of the k-d tree is examined. This process may be continued until a predetermined depth of the k-d tree is reached. One disadvantage of k-d trees is there is no predicatability. If objects move, the partitioning will not be effective.

Many game engines use a BSP tree or a k-d tree for spatial partitioning. Both of these algorithms construct a spatial hierarchical data structure in a computationally expensive preprocessing stage. If any objects move in the scene, the spatial hierarchical data structure becomes outdated, possibly resulting in incorrect results for queries. One solution to this problem is to update and reinitialize the data structure. However, reconstructing the BSP tree or k-d tree is a very time consuming process that renders these techniques unsuitable for use in processing a dynamic scene.

Although various techniques exist for spatial partitioning, none of the above-described techniques perform optimally in a variety of settings. Techniques that work well for static scenes perform poorly for dynamic scenes. What is needed is a technique and corresponding data structure that performs well for both static and dynamic scenes.

BRIEF DESCRIPTION OF THE DRAWINGS

The features and advantages of the present invention will become apparent from the following detailed description of the present invention in which.

DETAILED DESCRIPTION

Figure 1:
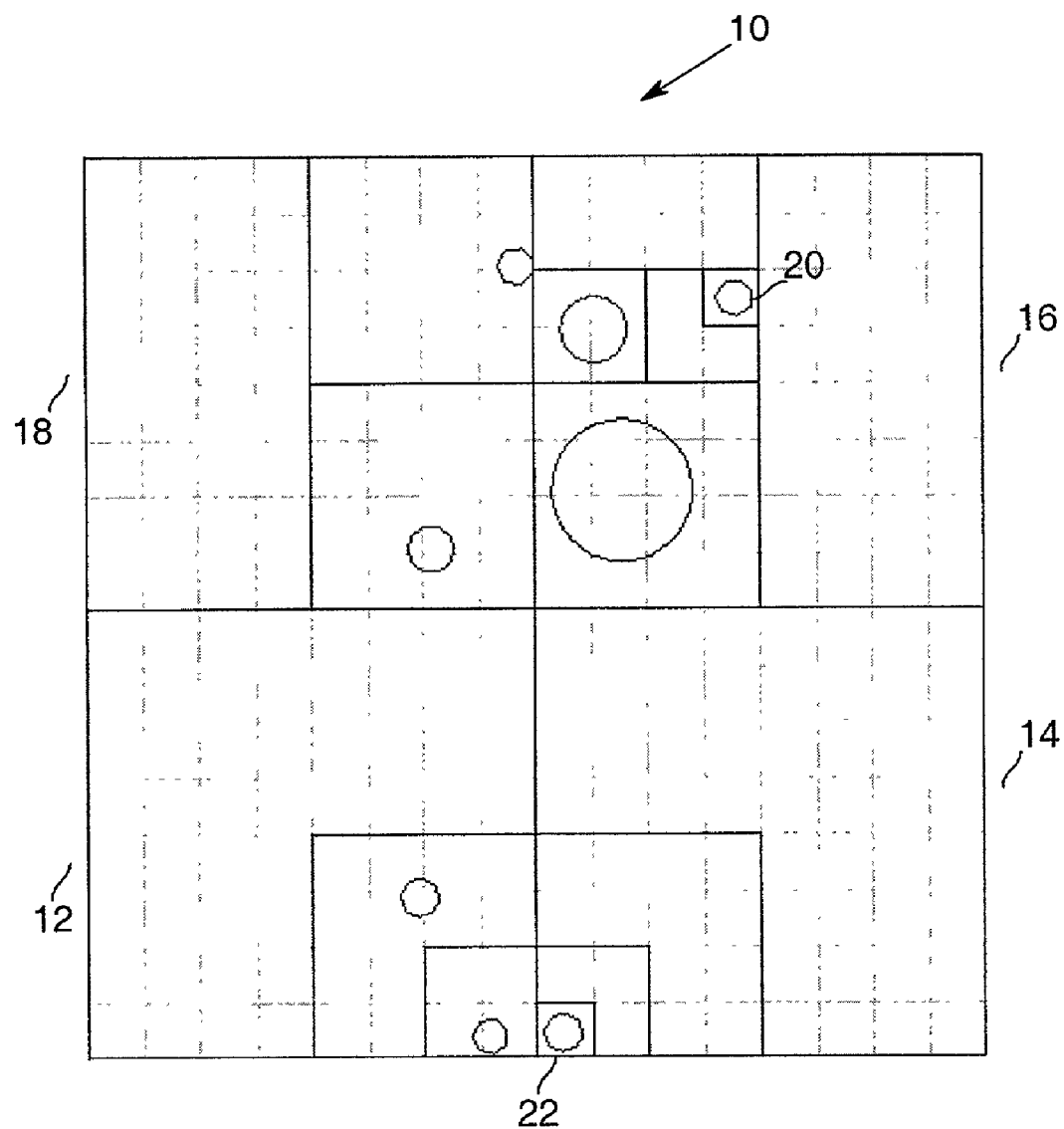
FIG. 1 is a diagram of a sample scene as partitioned into an octree (prior art)

An embodiment of the present invention is a technique for spatial partitioning and a data structure for storing references to objects in a scene. According to embodiments of the present invention, a grid-based loose octree (GLOtree) is a data structure that combines advantages of the uniform grid-based subdivision scheme and the octree-based subdivision scheme to provide a general purpose solution that works well with both static and dynamic scenes. In a GLOtree, objects may be located at lower levels of the tree than in the prior art octree. This allows traversals to search for specific objects to be accomplished more quickly when a starting search level of the GLOtree is predicted. The GLOtree uses the concept of loose octree nodes that can adapt the sizes of octants to the scene.

The use of the GLOtree is faster and more predictable than prior art methods. The GLOtree is more predictable than octrees in that the GLOtree does not incur potential latencies when fetching data (as can occur when using an octree). Octrees incur this latency because, as objects are fetched, the entire tree needs to be traversed starting from the root node of the octree down to the level of the octree with the node referencing the object of interest. In a GLOtree, the cell of a 3D grid superimposed on the scene containing a selected object may be predicted. This cell corresponds to a node of the GLOtree. The GLOtree may then be traversed starting from this node instead of the root node. In addition, the GLOtree achieves a combination of speed, good adaptable partitioning, and the ability to be modified quickly.

The GLOtree may be used for spatial partitioning in a scene management system. The present invention works well for dynamic scene interaction operations such as collision detection, picking, and ray intersection.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

The GLOtree is based on the octree. An octree is an acyclic directed graph with a maximum of eight children at every node. This structure works well for representing a 3D world subdivided into cubes. The root node of the octree contains a cube that encloses all of the geometry in the world (in other words, the cube corresponding to the root node circumscribes the space of interest). The children at each node are the eight cubes of equal size that subdivide the parent into octants. Subdivision stops when some user-defined heuristic is met, typically either the bounding cubes are of a certain size, or some minimum number of objects are contained within each node. The bounding cubes (e.g., octants) at each node are useful for using an octree for spatial subdivision. Each node contains pointers to all of the polygons that lie within that octant's volume. For visibility determination, the axis-aligned bounding cube of a node of the octree may be tested against the view frustrum. If a node's objects are fully visible, then all of the node's geometry (including interior octants) will be rendered. If the node's objects are partially visible, traversal of the octree continues down to the children nodes. If the node's objects are not visible (e.g., outside of the view frustrum), traversal can stop because all objects of the node are not visible.

The GLOtree of embodiments of the present invention improves upon the octree by placing a uniform 3D grid structure on top of an octree for a predetermined number of levels (e.g., two or three levels) of the GLOtree. The octree may be constructed and then the uniform grid may be applied, once the position of objects in the scene are known. This transforms the octree into a grid-based octree. To determine the uniform grid, the grid-based octree may be divided recursively into overlapping partitions (that is, in embodiments of the present invention, octants may be non-uniform and overlap). The extent of the overlap may be controlled by a looseness constant denoted "k", thereby creating the grid-based loose octree (GLOtree). In one embodiment, a value for k may be between 1.0 and 2.0, although other values may also be used. The looseness of the GLOtree, as defined by the looseness constant, allows the size of one or more octants to be modified to encompass one or more objects without splitting the object. In one embodiment, looseness of an octant may be a factor of the objects straddling partition planes of the octant.

One advantage of overlapping partitions (i.e., the loose part of the GLOtree) is that it forces small objects that straddle octree partition planes lower down into the GLOtree. This results in a better spatial partitioning of the scene. In other words, an object doesn't have to be split with the present invention. Instead, the octant size will accommodate the object at a particular level of the octree.

A comparison of the present invention to an octree may be useful for understanding the advantages of the GLOtree. FIG. 1 is a diagram of a sample scene as partitioned into an octree (prior art). In the sample scene of FIG. 1, circles represent objects in the scene. In the simple scene represented, there are eight objects. For illustrative purposes, a 2D scene is shown (e.g., a slice of a 3D scene), where subdivision of the space produces quadrants of a quadtree. However, the following description may of course be expanded into three dimensions. Herein, the term octree is used for explanatory purposes when describing the sample scenes to denote both a quadtree and an octree. Similarly, the term octant is used for explanatory purposes when describing the sample scenes to denote both a quadrant and an octant.

When using an octree, a spatial partitioning mechanism will subdivide the space 10 into a first level of octants. In the 2D slice of FIG. 1, four octants are shown, labeled 12, 14, 16, and 18. Each octant is then further subdivided into sub-octants wherever a sub-octant contains an object. This process is repeated recursively to a specified depth. In the sample shown, the lowest level of subdivision of the octree is five. The fifth level includes objects 20 and 22 as shown.

Figure 2:
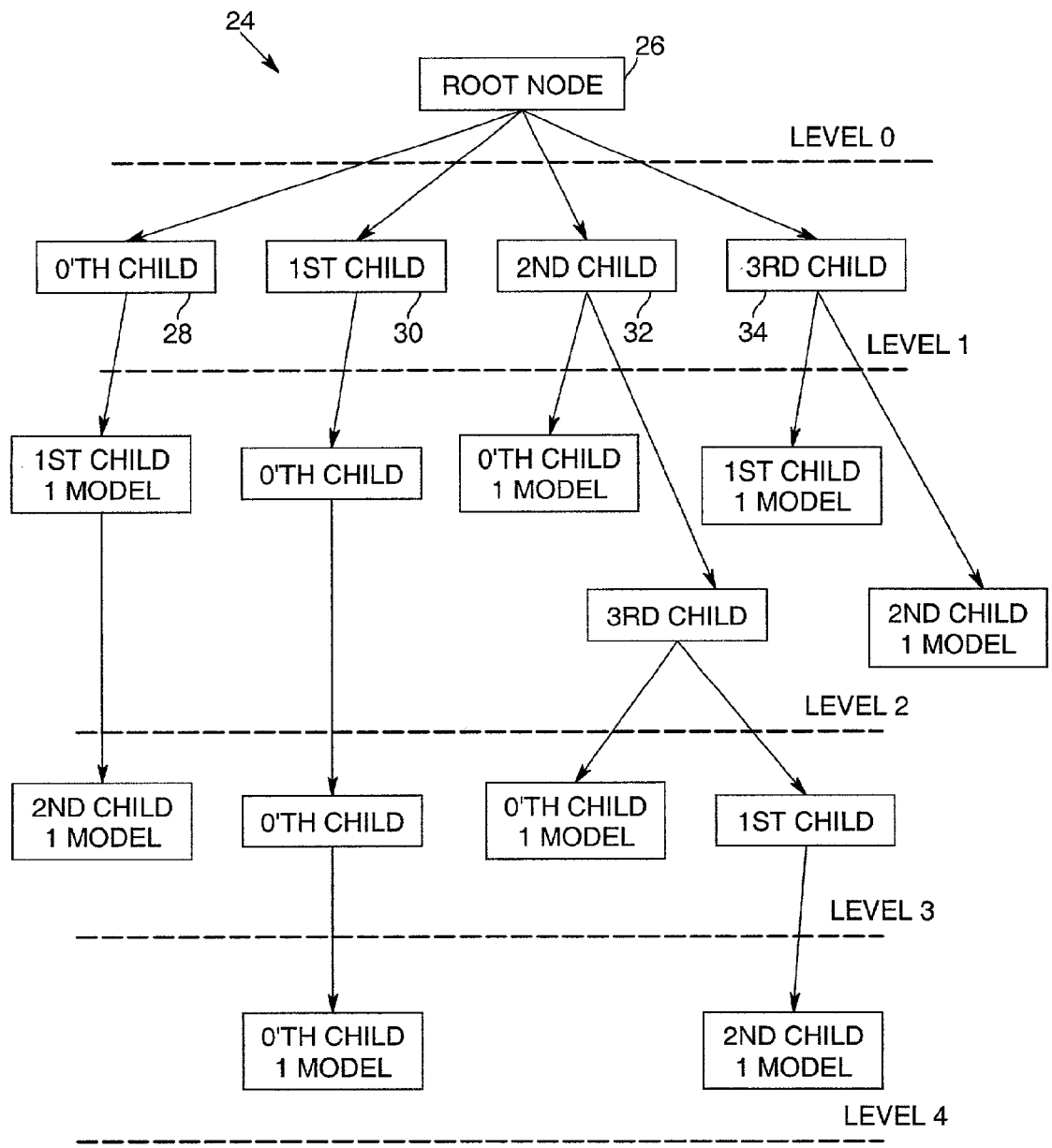
FIG. 2 is a diagram of the octree representing the scene of FIG. 1 (prior art)

FIG. 2 is a diagram of the octree representing the scene of FIG. 1 (prior art). In this octree 24, the root node 26 has four children 28, 30, 32, and 34, representing the four octants 12, 14, 16, and 18, respectively. Each of these octants is further subdivided according to FIG. 1 to create the tree structure represented in FIG. 2.

Figure 3:
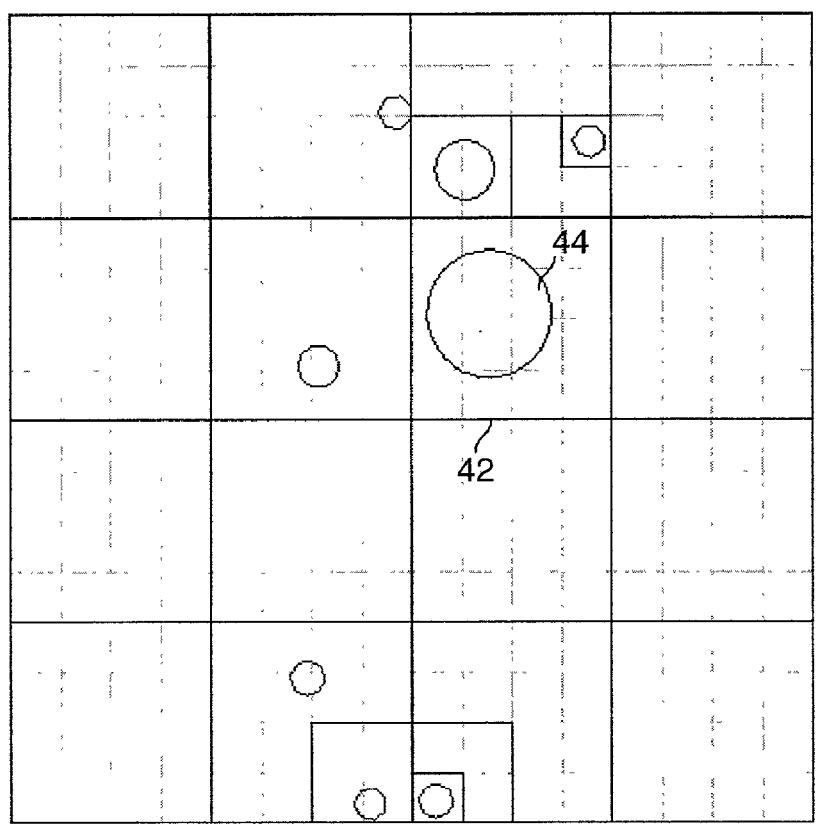
FIG. 3 is a diagram of the sample scene partitioned into a grid-based loose octree illustrating the grid aspect according to an embodiment of the present invention.

FIG. 3 is a diagram of the sample scene partitioned into a grid-based loose octree illustrating the grid aspect according to an embodiment of the present invention. In this example, the looseness constant is 1.0, so no "stretching" of an octant is performed. When using a GLOtree, a uniform 3D grid is superimposed onto the octree. In the 2D sample shown in FIG. 3, a 4×4 2D grid is overlaid onto the scene for the first two levels of the octree.

Figure 4:
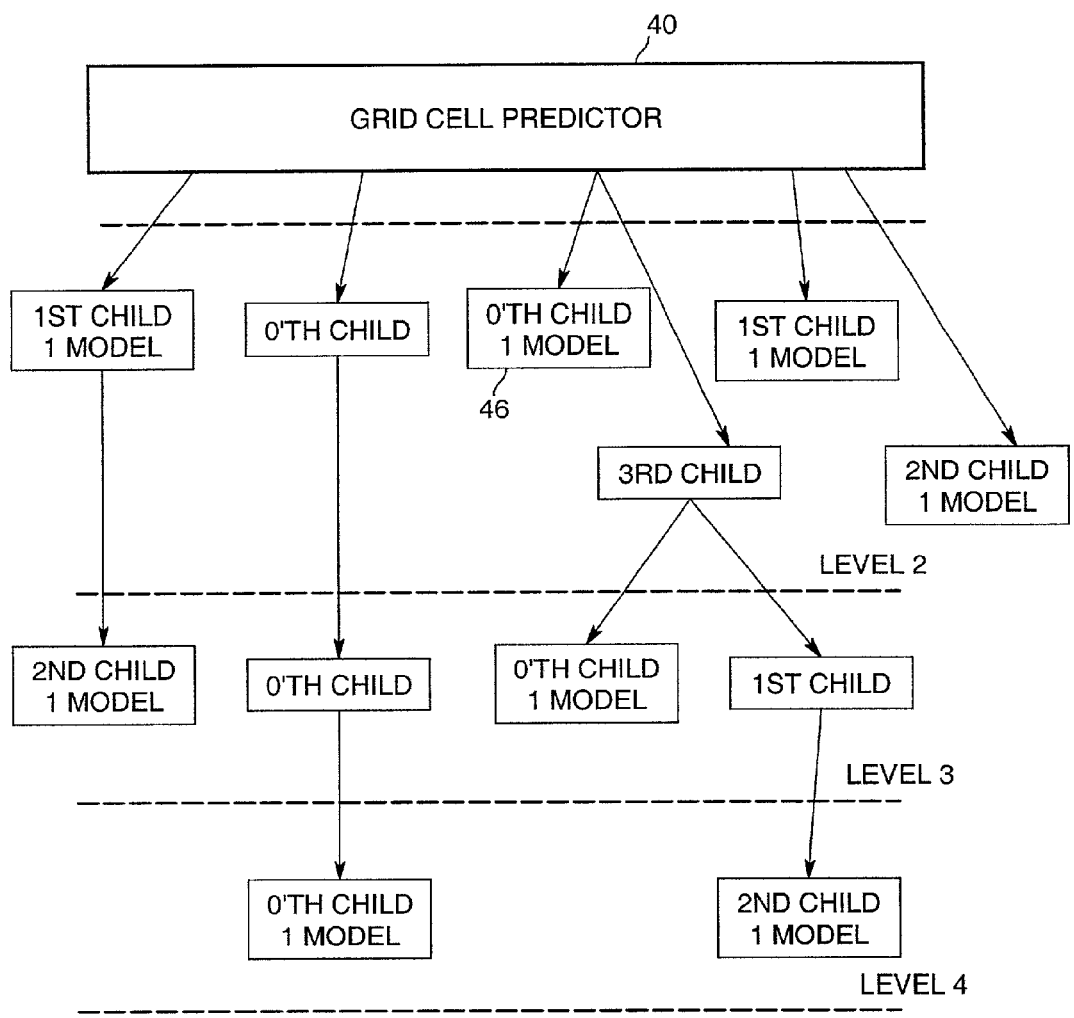
FIG. 4 is a diagram of the grid-based loose octree representing the scene illustrating the grid aspect according to an embodiment of the present invention.

FIG. 4 is a diagram of the grid-based loose octree representing the scene illustrating the grid aspect according to an embodiment of the present invention. With the GLOtree, a grid cell predictor mechanism 40 may be used instead of searching and/or traversing the root node and the level one child nodes. The grid may be used to directly access the level two nodes containing models. For example, grid cell (3, 2) in FIG. 3 identifies cell 42 containing object 44. This corresponds to the GLOtree node labeled 0'th child, 1 model 46.

Figure 5:
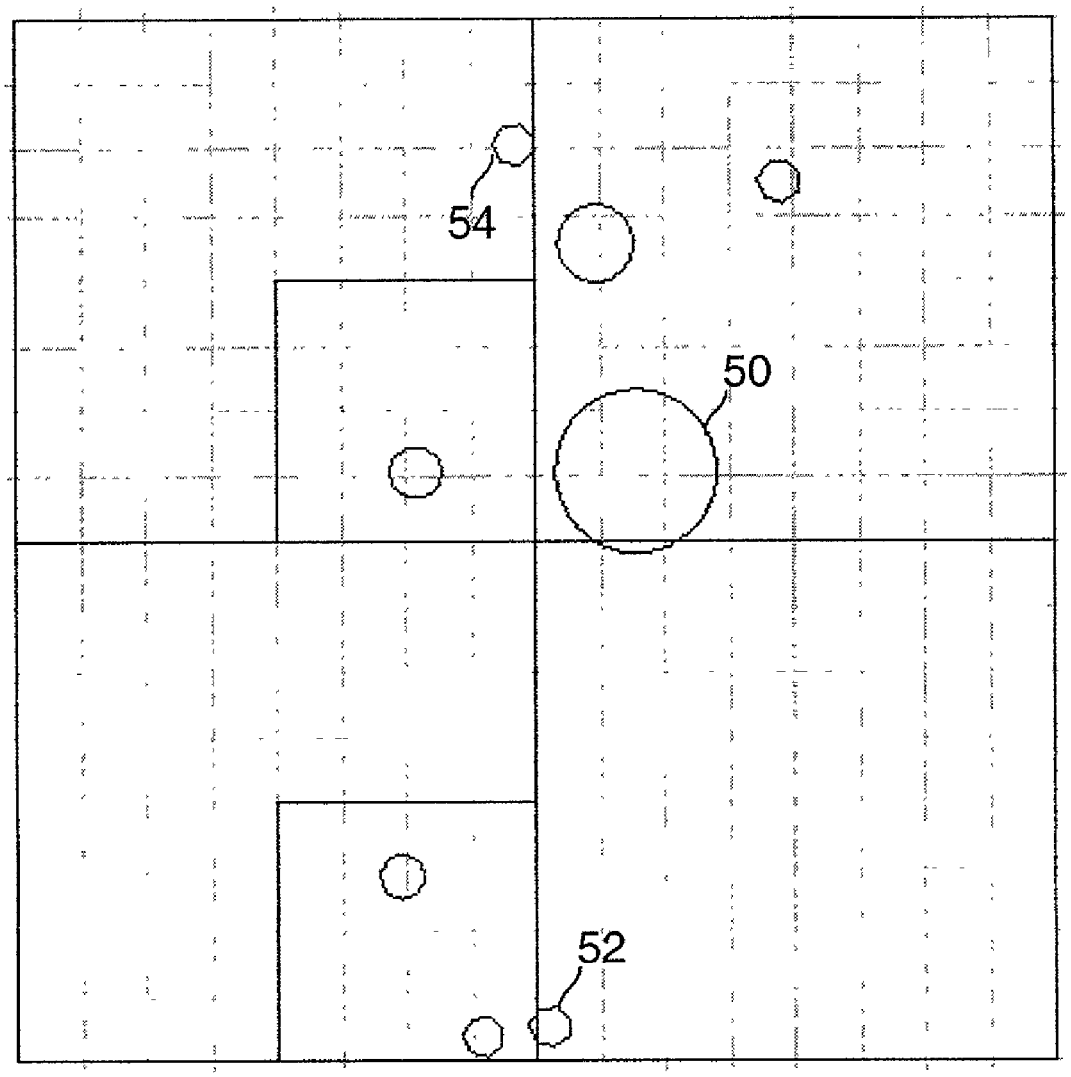
FIG. 5 is a diagram of another sample scene as partitioned into an octree (prior art)

FIG. 5 is a diagram of another sample scene as partitioned into an octree (prior art). In this example, three of the objects 50, 52, and 54 straddle octant boundaries. Since they straddle octant boundaries and thus are not within an octant, when using an octree these objects are contained in the root node.

Figure 6:
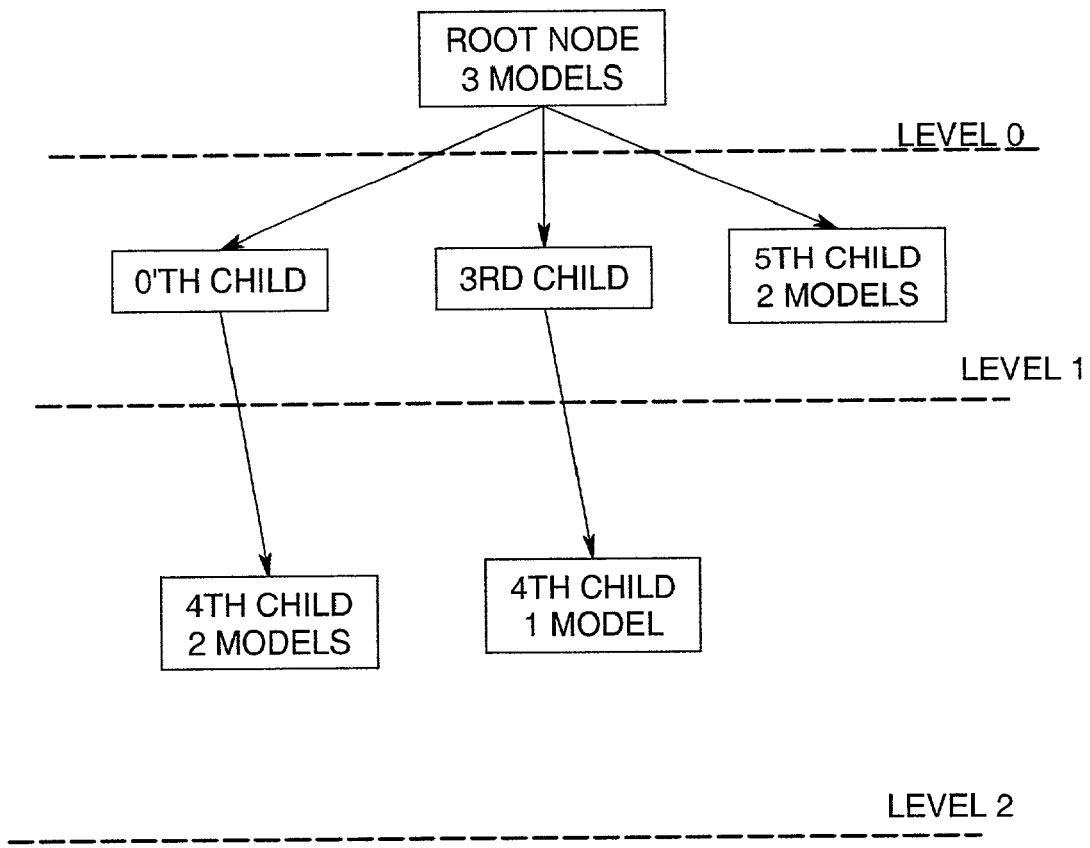
FIG. 6 is a diagram of the octree representing the scene of FIG. 5 (prior art)

FIG. 6 is a diagram of the octree representing the scene of FIG. 5 (prior art). The octree has fewer levels because of the occurrence of the objects straddling octant boundaries. Hence, the partitioning is poor. Table I presents the allocation of objects (e.g., models) of the sample scene of FIG. 5 to levels of the sample octree of FIG. 6.

TABLE I

| |
|---|
| num models depth at level 0 = 3 |
| num models depth at level 1 = 2 |
| num models depth at level 2 = 3 |
| num models depth at level 3 = 0 |
| num models depth at level 4 = 0 |
| num models depth at level 5 = 0 |

Figure 7:
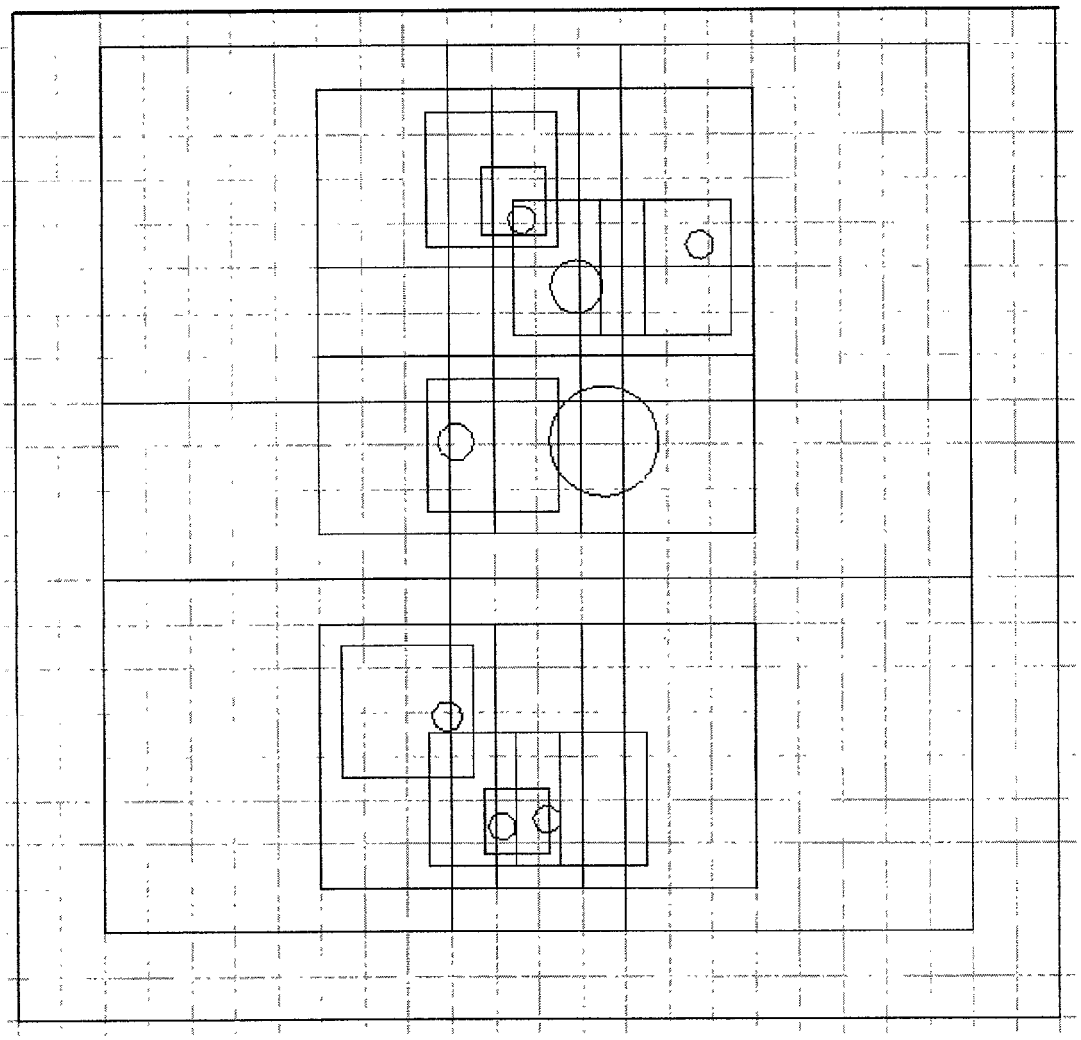
FIG. 7 is a diagram of the sample scene partitioned into a grid-based loose octree illustrating the looseness aspect according to an embodiment of the present invention.

FIG. 7 is a diagram of the sample scene partitioned into a grid-based loose octree illustrating the looseness aspect according to an embodiment of the present invention. As shown in FIG. 7, when using the GLOtree the objects reside deeper in the tree, thus producing a better partition. Objects in higher levels of the tree are not desirable as the partition space the objects occupy is large and end up affecting objects in all lower octants.

Figure 8:
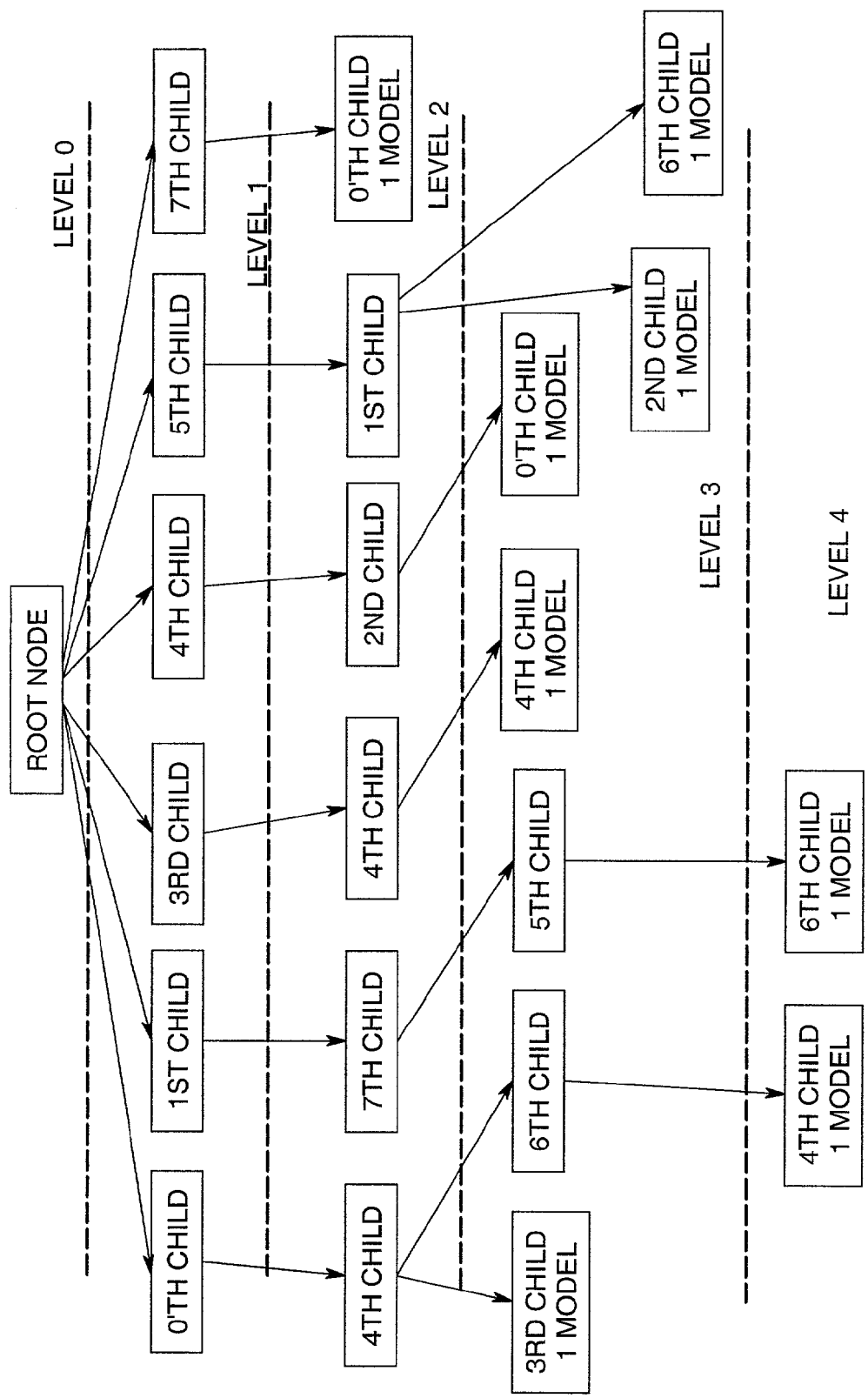
FIG. 8 is a diagram of the grid-based loose octree representing the scene illustrating the looseness aspect according to an embodiment of the present invention.

FIG. 8 is a diagram of the grid-based loose octree representing the scene of FIG. 7 illustrating the looseness aspect according to an embodiment of the present invention. Note that octants having no objects are not shown in the GLOtree of FIG. 8.

Table II presents the allocation of the objects (e.g., models) of the scene of FIG. 7 to levels of the sample GLOtree of FIG. 8.

TABLE II

| |
|---|
| num models depth at level 0 = 0 |
| num models depth at level 1 = 0 |
| num models depth at level 2 = 1 |
| num models depth at level 3 = 5 |
| num models depth at level 4 = 2 |
| num models depth at level 5 = 0 |

Note in comparing the data in Tables I and II, that application of the GLOtree results in objects being accessible at lower levels of the tree structure. This is a more desirable partition because an examination of the tree for collision detection must examine nodes at the current level of the tree, all of the levels above the current level, and a small subset of the nodes lower in the tree hierarchy. The only nodes below the current node of the GLOtree that have to be considered are the ones in which octants are occupied by objects. Thus, the number of tests during collision detection may be reduced for the GLOtree as compared to the octree.

Figure 9:
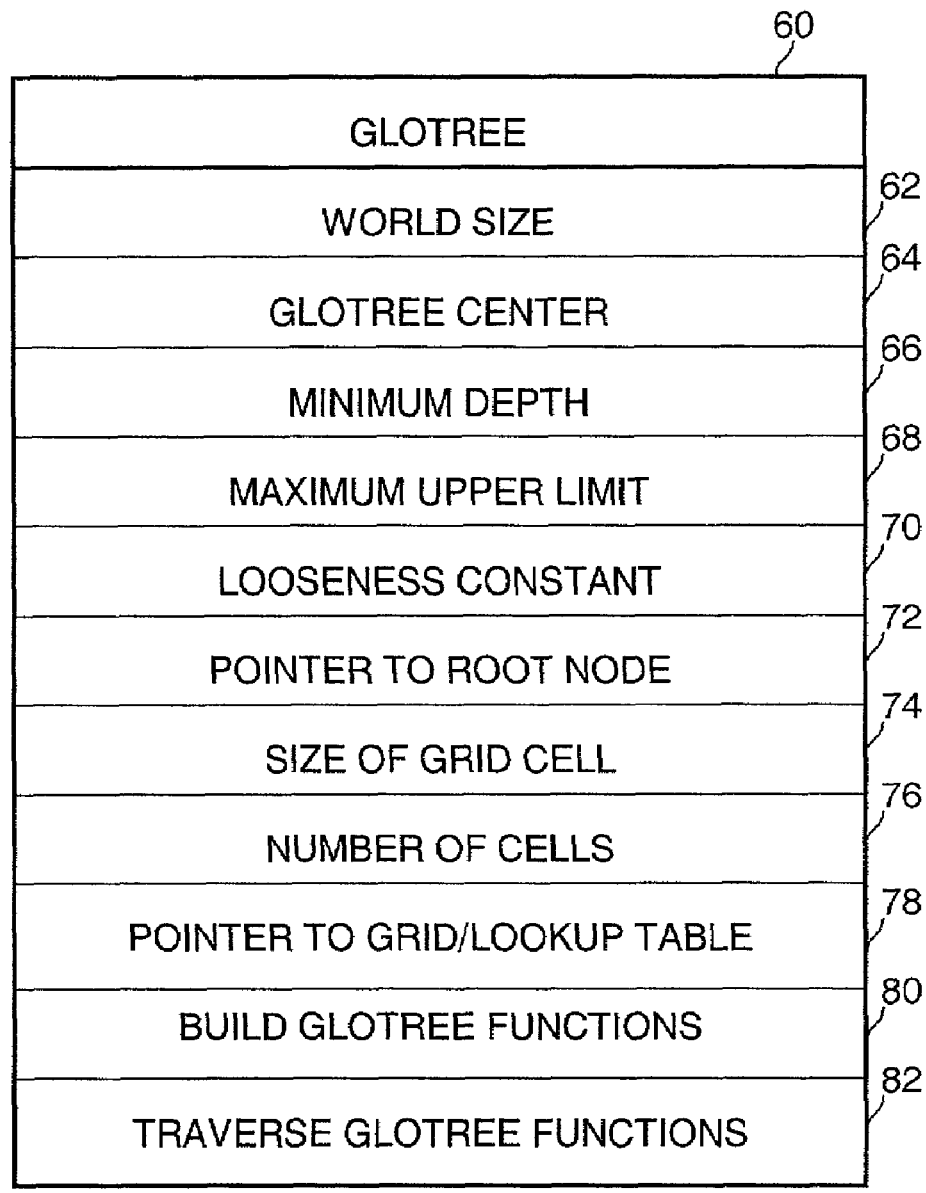
FIG. 9 is a diagram of fields in a grid-based loose octree definition according to an embodiment of the present invention.

The GLOtree data structure may be comprised of a tree containing one root node and a plurality of child nodes. FIG. 9 is a diagram of fields in a grid-based loose octree 60 definition according to one embodiment of the present invention. The world size field 62 specifies the size of the 3D world that is being partitioned by the GLOtree. The GLOtree center field 64 comprises a three element vector (e.g., x, y, and z coordinates) specifying the center of the GLOtree in 3D space. The minimum depth field 66 specifies the minimum depth of the GLOtree used for construction of the grid. The minimum depth may be computed depending on data distribution of the scene. The maximum upper limit field 68 define the maximum upper value specified by a user to limit recursion when building the GLOtree. The looseness constant field 70 may be used to adjust the looseness or overlap of the node boundaries. The pointer to root node field 72 comprises a pointer to the root node of the GLOtree. The root node has the same size and center as the GLOtree. The size of grid cell field 74 defines the size of the grid cell. In one embodiment, this is equal to the size of the octant at the minimum depth. The number of cells field 76 comprises the number of cells in the x, y, and z dimensions. In one embodiment, the number of cells is equal to the world size divided by the size of a grid cell. The pointer to grid/lookup table field 78 comprises a pointer to a lookup table representing the grid. Finally, the GLOtree definition includes one or more functions to build the GLOtree 80 and to traverse the GLOtree 82.

Table III shows one embodiment of a class definition of the GLOtree data structure. The example shown in Table III does not limit the scope of the invention in any way and is included merely for illustrative purposes. Other implementations of a GLOtree definition within the scope of the invention may be made.

TABLE III

© 2002 Intel Corporation
class CGLOtree
{
    float m__worldSize;
    Vector3 m__center;
    int m__minDepth;
    int m__maxDepth;
    float m__looseK;
    CGLOctreeNode * rootnode;
    float m__cellSize;
    int m__numCells;
    CGLOctreeNode * [ ][ ][ ] m__lookUpTable;
    // Functions to build the tree.
    // Functions to traverse the tree.
}

Figure 10:
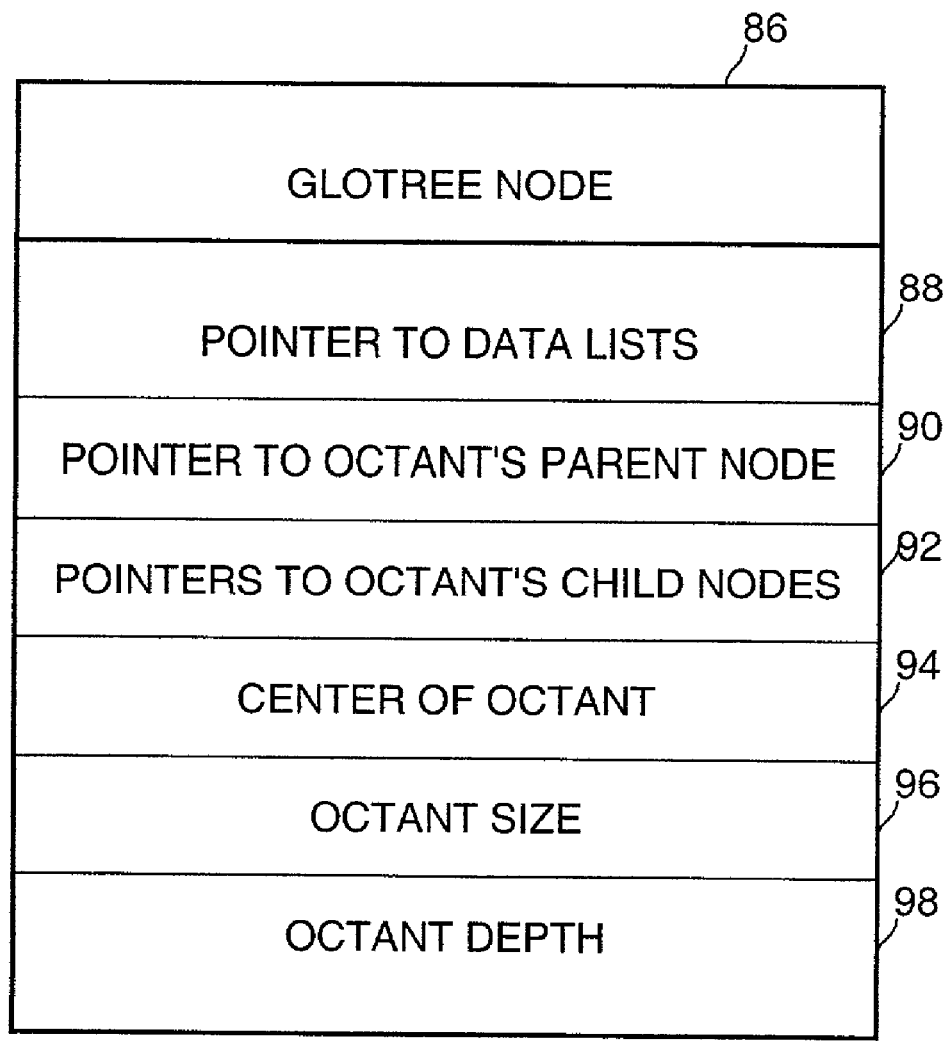
FIG. 10 is a diagram of fields in a grid-based loose octree node definition according to an embodiment of the present invention.

FIG. 10 is a diagram of fields in a grid-based loose octree node definition according to an embodiment of the present invention. Each GLOtree node 86 may be defined as having at least the following fields. The pointer to data lists field 88 comprises a pointer to lists that store different types of data contained in the space occupied by the octant for this node. The data may be models, lights, sounds, and so on. The pointer to octant's parent node field 90 comprises a pointer to the octant's parent node. This field is null for the root node. The pointers to octant's child nodes field 92 comprise pointers to each of the octant's child nodes. The children of an octant divide the octant's space into eight equal octants if the looseness constant is one. According to embodiments of the present invention, the children's space will overlap if the looseness constant is greater than one. The center of octant field 94 includes a three element vector specifying the octant's center in 3D (e.g., x, y, and z coordinates). The octant size field 96 defines the size of the octant for this node. The octant depth field 98 stores the depth of the node in number of levels on the GLOtree.

Table IV shows one embodiment of a class definition of a data structure for a node of the GLOtree. The example shown in Table IV does not limit the scope of the invention in any way and is included merely for illustrative purposes. Other implementations of a GLOtree node definition within the scope of the invention may be made.

TABLE IV

© 2002 Intel Corporation
class CGLOtreeNode
{
    DATA_LIST*    m__pDataList;
    CGLOctreeNode*    m__pParent;
    CGLOctreeNode*
    m__pChildren[MAX_CHILD_X][MAX_CHILD_Y][MAX_CHILD_Z];
    Vector3 m__center;
    int m__size
    int m__depth;
}

Figure 11:
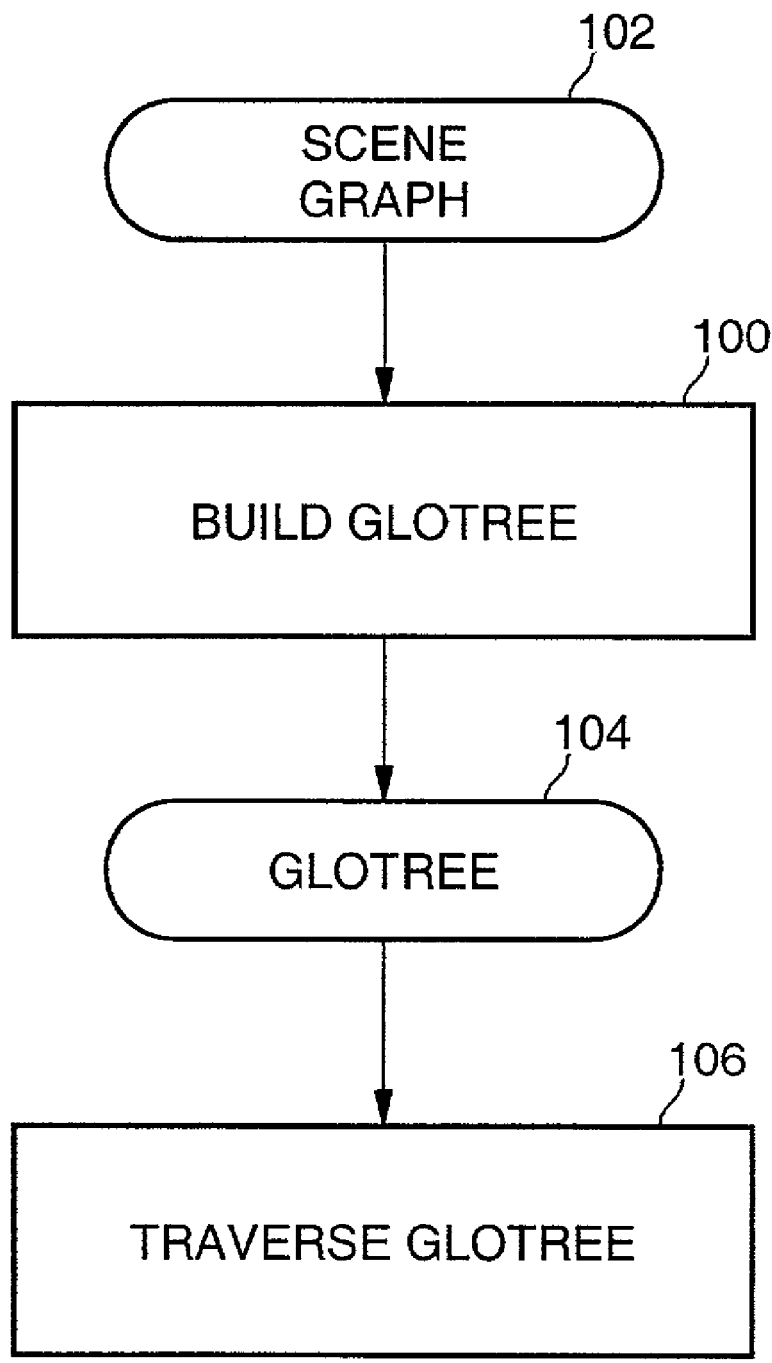
FIG. 11 is a high-level flow diagram illustrating building and traversing a grid-based loose octree according to an embodiment of the present invention.

FIG. 11 is a high-level flow diagram illustrating building and traversing a grid-based loose octree according to an embodiment of the present invention. The GLOtree may be built at block 100 from data stored in a scene graph 102. A scene graph is a data structure used to store data about objects of a scene. Traditionally, computer graphics applications use scene graphs to describe information hierarchies and, optionally, to limit effects of lights, shaders, etc. The scene graph does not contain proximity information, which makes it impossible to efficiently find objects located spatially close to each other. A hierarchical spatial database organizes the data spatially and is therefore suited for proximity queries. One such hierarchical spatial database is the GLOtree 104. Once the GLOtree has been built to represent a scene, the GLOtree may be traversed at block 106.

A first step to building a GLOtree is to obtain a list of objects from the scene graph. Next the world bounds for each object may be obtained to compute the overall world bounds. Once the object list has been created (and the looseness constant has been determined), the root node of the GLOtree may be constructed as defined (in one embodiment) in FIG. 10 and Table IV. By definition, the geometry list for the root node will contain all of the polygons in the scene. Starting from this root node, the scene may be subdivided recursively as a part of the process of building the GLOtree. The nodes may be arranged in a data structure as defined (in one embodiment) in FIG. 9 and Table III.

Figure 12:
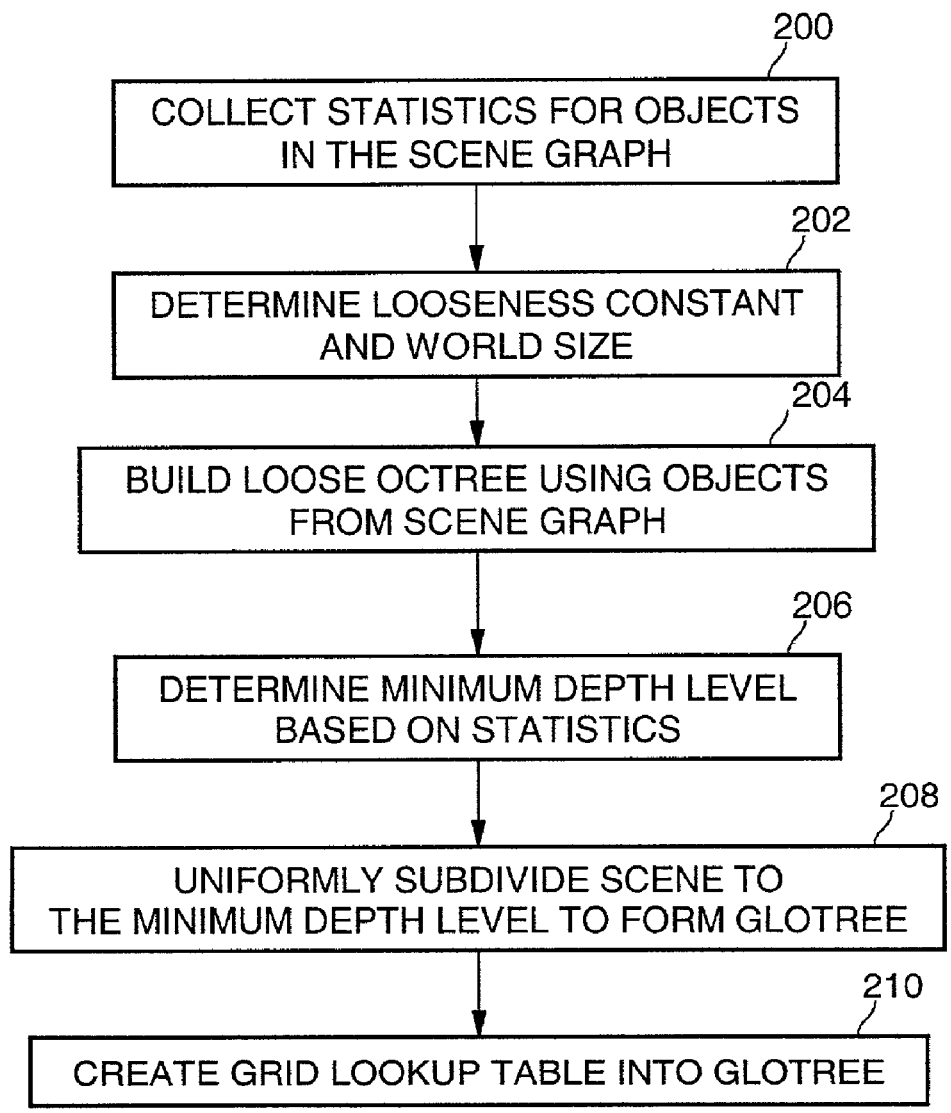
FIG. 12 is a flow diagram of building a grid-based loose octree according to an embodiment of the present invention.

FIG. 12 is a flow diagram of building a grid-based loose octree according to an embodiment of the present invention. Initially, at block 200, statistics of the models in the scene graph may be collected. For every object in the scene graph, statistics may be gathered, such as the type of geometry of the object (e.g., static or dynamic), the complexity of the object in terms of number of polygons, and the memory requirements (including mesh, topology, and texture information). The number of objects at each level of the scene graph may also be determined. At block 202, the looseness constant "k" may be determined, as well as the world size.

At block 204, the GLOtree may be built using the objects from the scene graph, the looseness constant and the world size. For each object in the scene, the object may be added to a node of the GLOtree (with new nodes being created as needed). If an object straddles a boundary region between octants, the size of the relevant octant may be increased such that it can contain the object (within the constraint of the looseness constant). At block 206, the minimum depth level of the GLOtree may be determined based on the statistics gathered in block 200. The minimum depth level is the starting level in the GLOtree where tree traversal (using the 3D grid) begins. The minimum depth level may be a function of one or more of the least depth at which objects are contained, the least depth at which non-static objects are contained, and the gathered statistics.

The scene may then be recursively and uniformly subdivided at block 208 to the minimum depth level, handling all objects in the scene and creating nodes in the GLOtree, until no more unprocessed objects exist. At block 210, a grid lookup table into the GLOtree may be created. The grid lookup table may be used to directly access a level of the GLOtree specified by the minimum depth level when traversing the GLOtree. In one embodiment, the grid lookup table comprises a tabular array of n×n×n pointers. Each pointer references a node in the GLOtree. The index into the grid lookup table may be computed using an object's center position and quantizing the position into the cells of the grid (e.g., object center x, y, z/cell size).

Once the looseness constant, the world size, and the minimum depth level are known, the size of a cell in the 3D grid may be determined by multiplying the looseness constant by the world size and dividing by ($2 \wedge$ minimum depth level).

Table V illustrates one embodiment of pseudo code for building a GLOtree. The example pseudo code shown in Table V does not limit the scope of the invention in any way and is included merely for illustrative purposes. Other implementations of building a GLOtree within the scope of the invention may be made.

TABLE V

```
© 2002 Intel Corporation
Build GLOTree (SpatialData** pObjects, int numberOfDataElements)
    worldSize = 0;
    worldPosition = {0,0,0}
    // The Incorporation of objects gives an optimal world size and world
    // position
    while all the data elements not incorporated
        // Incorporate (object) size and position into the world size position
        Incorporate Object Bounds Into World Position And Size
    End while
    Compute Optimal looseness k for given data
    rootnode = Create GLO-tree with computed world size, position and
    looseness constant k
    While all objects not inserted into GLO-tree
        Insert (rootnode, Object)
    End while
        Compute a min depth value for the tree
        // The min depth = lowest level of tree which contains //models
    Compute & Initialize Grid Look Up Table
End Build GLOTree
Incorporate Object Bounds Into World Position And Size
    dist = distance between world position and object position
    if worldSize < object size + dist then
        // The Object is not contained by the world
        if object size > word size + dist then
            // Object Contains the world
                worldsize = object size
                worldPosition = object position
            else
            // Need to Compute a new sphere that contains both spheres
            scale = world size – object size / dist
            world position = object position + (world Position –
            objectPosition)*scale;
            worldSize = object size + (worldsize – object size)*scale;
                worldSize = (worldSize + object size + dist) / 2
            end if
        end if
end Incorporate
Insert (treeNode, object)
    If object fits in treeNode then
        Current node = created child node
        pick a would be child node depending on the object's position
        while object fits in would be child node
            create new child node
            pick a new would be child node depending on the object's
            position
        end while
        Add object to GLOtree node
    end if
End Insert
Compute And Initialize Grid Look Up Table
    cellSize = size of Octant at minimum depth level
    number of cells = worldSize / cellSize
    Make Grid[x][y][z] point to all Octants at minimum depth level.
End Compute And Initialize Grid Look Up Table
```

Once the GLOtree has been built, the GLOtree may be traversed for various purposes during use. In one technique, the GLOtree may be traversed hierarchically from the root node (similar to existing techniques for traversing an octree).

In another technique according to an embodiment of the present invention, the GLOtree may be traversed using the grid to select a "sub-tree" of the GLOtree containing the invention in any way and is included merely for illustrative purposes. Other implementations of traversing a GLOtree within the scope of the invention may be made.

TABLE VI

Figure 13:
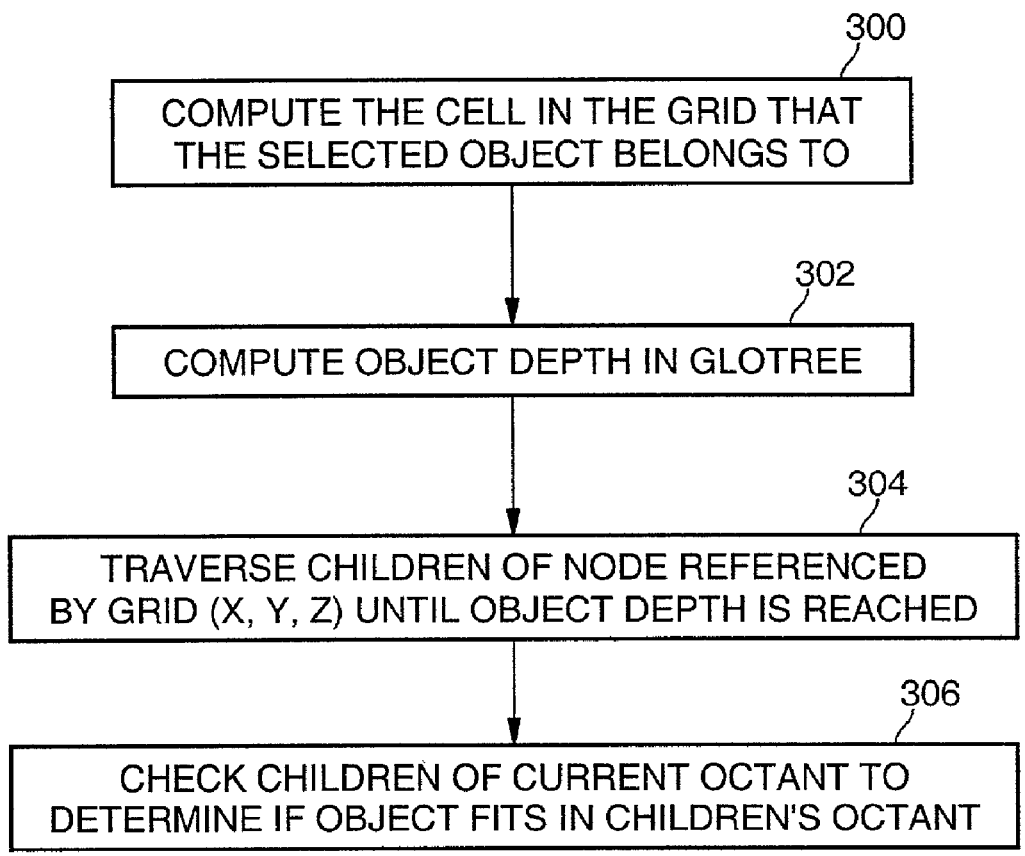
FIG. 13 is a flow diagram of traversing a grid-based loose octree according to an embodiment of the present invention.

© 2002 Intel Corporation
Proximity Traversal
    //Traverse the GLOtree to find objects contained in a sphere of influence.
    //Compute the Grid Cell the Proximity sphere is in
        Grid (x, y, z) = sphere position (x, y, z) / cell size
    // Assume for simplicity that the proximity sphere fits in a cell
        Get the corresponding Octant from Grid[x][y][z]
    // Choose child octant based on the position of proximity sphere
    // Refer to Build tree
    Clear proximity list
    // Compute the best fit octant
    Current octant = root
    while (proximity sphere fits in current octant)
        Add to proximity list all objects in the current octant that are
        contained or intersected by the sphere of influence
        Choose the next child octant based on the position of proximity
        sphere
    end while
    Get contained objects from octant (best fit)
    Return proximity list
end Proximity Traversal
Get Contained Objects From Octant (octant)
    if octant exists then
        if octant fits in proximity sphere then
            get all objects from octant and add all objects to the
    proximity list
            while child octants exist
                Get Contained Objects From Octant (child octant)
            End while
        end if
        if octant partially contains the octant or if the octant contains the
    proximity sphere then
            get objects from the octant
            do an intersection test to make sure objects are contained
            by the proximity sphere
            add them to the objectList
            While child octants exist
                Get contained objects from octant (child octant)
            end while
        end if
    end if
end Get Contained Objects From Octant desired object or point in space. FIG. 13 is a flow diagram of traversing a grid-based loose octree according to one embodiment of the present invention. At block 300, the cell in the grid that a selected or desired object belongs to may be computed. The cell points to or references a node in the GLOtree representing an octant. At block 302, the depth in the GLOtree of the selected object may be computed. In one embodiment, the object depth equals floor (log 2 (looseness constant*worldSize/4*objectRadius))–minimum depth level. The object depth is the number of levels down from the root in the GLOtree where the node for the object resides. Grid (x, y, z) points to or references a node in the GLOtree containing information about the selected object (i.e., the octant of the scene represented by this node contains the object). At block 304, children of the referenced node may be traversed until the object depth (computed at block 302) is reached. In one embodiment, a child octant may be chosen depending on the position of the object's center as compared to the octant center. At block 306, the children of the current octant may be checked to determine if the object fits in the children's octant.

Table VI illustrates one embodiment of pseudo code for one method of traversing a GLOtree. The example pseudo code shown in Table V does not limit the scope of the In another embodiment, this data structure may be adapted to each octant on demand. This is different from other embodiments where all the octants were uniform. Here, if and only if an object straddles the partition plane, the octant may be loosened to accommodate the straddling object, but by a maximum factor of K (i.e., the looseness constant of the GLOtree). In this case, the individual looseness of each octant varies from 1.0 to K. One advantage of this embodiment is that the number of octants to be tested is reduced, because not all of the octants are loose and overlap.

Embodiments of the present invention are faster, more predictable, have adaptable partitioning for irregular datasets, and faster adaptation to dynamic datasets than other known data structures and partitioning schemes. The present invention is more predictable because the GLOtree reduces potential latencies when fetching data associated with data structures such as octrees. In addition, the present invention is faster than other methods by making use of uniform partitions higher up in the data structure, which is computed by obtaining statistical information about the scene. In at least one prior art method, the computational complexity of traversing an octree is $O(n \log n)$. Different types of traversals of the GLOtree may be performed, each traversal algorithm exhibiting a complexity. The computational complexity of simple tree traversal is O(log n). With a GLOtree, the computational complexity of a simple traversal of the GLOtree with a minimum depth of n/2 is O(log(n−minimum depth level))=O(log(n/2)). Since the GLOtree is hierarchical, the GLOtree is able to adapt to irregular data sets, and since the GLOtree is loose, the partitioning is more effective. The GLOtree may work with other scene management algorithms operating on uniform grids, octrees, and BSP trees.

By using overlapping partitions (e.g., the loose part of the GLOtree), embodiments of the present invention force small objects that straddle the octree partition plane lower down the tree, thereby achieving a better partition. This differs from a uniform octree that either forces a split to the object at the octant edge boundary or would duplicate objects in two or more octants, thereby increasing the computational cost of computing the octree and during traversal due to maintenance of additional data structures. The computation includes the clipping against the octree boundary, which tends to be expensive, particularly at run time. In contrast, a GLOtee will simply increase in size to accept the entire object that straddles the boundary with simple comparison tests.

Another advantage of using the GLOtree is the large reduction in any object-object interactions. The most expensive of these interactions are model-light associations and model-model collision detection. With octants, one may specify only lights within neighboring octants and the selected octant for lighting. Similarly, the potential number of colliding objects may be reduced, resulting in performance increases proportional to the number of models in the scene. Uniform subdivisions at higher levels of the GLOtree can produce information on near objects and far objects, which enables the use of image-based rendering techniques for geometry simplification. Thus, the GLOtree also enables an effective pipeline to combine acceleration techniques from image-based rendering for geometric simplification, and fast visibility culling of large scenes.

The techniques described herein are not limited to any particular hardware or software configuration; they may find applicability in any computing or processing environment. The techniques may be implemented in hardware, software, or a combination of the two. The techniques may be implemented in programs executing on programmable machines such as mobile or stationary computers, personal digital assistants, set top boxes, cellular telephones and pagers, and other electronic devices, that each include a processor, a storage medium readable by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that the invention can be practiced with various computer system configurations, including multiprocessor systems, minicomputers, mainframe computers, and the like. The invention can also be practiced in distributed computing environments where tasks may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components. The methods described herein may be provided as a computer program product that may include a machine readable medium having stored thereon instructions that may be used to program a processing system or other electronic device to perform the methods. The term "machine readable medium" used herein shall include any medium that is capable of storing or encoding a sequence of instructions for execution by the machine and that cause the machine to perform any one of the methods described herein. The term "machine readable medium" shall accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system cause the processor to perform an action of produce a result.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method of spatial partitioning of a scene represented by a scene graph comprising:
    collecting statistics of objects in the scene graph;
    determining a looseness value and a world size for the scene;
    building a loose octree using objects from the scene graph and the looseness value;
    determining a minimum depth level based on the collected statistics; and
    subdividing the scene to the minimum depth level using a three-dimensional grid superimposed on the loose octree to form a single data structure called a grid-based loose octree to represent spatial partitioning of the scene, wherein a size of each cell in the three dimensional grid is determined by multiplying the looseness value by the world size and dividing by two to the power of the minimum depth level.

2. The method of claim 1, further comprising creating a grid lookup table used to reference a selected node of the grid-based loose octree.

3. The method of claim 1, wherein subdividIng the scene comprises uniformly subdividing the scene recursively.

4. The method of claim 1, wherein determining the looseness value comprises determining the looseness value such that objects of the scene do not straddle boundaries of octants of the scene.

5. The method of claim 4, wherein the octants overlap, the extent of the overlap determined by the looseness value.

6. The method of claim 1, wherein a node of the grid-based loose octree corresponds to an octant of the subdivided scene.

7. An article comprising: a storage medium having a plurality of machine readable instructions, wherein when the instructions are executed by a processor, the instructions provide for spatial partitioning of a scene represented by a scene graph, the instructions for collecting statistics of objects in the scene graph, determining a looseness value and a world size for the scene, building a loose octree using objects from the scene graph and the looseness value, determining a minimum depth level based on the collected statistics, and subdividing the scene to the minimum depth level using a three-dimensional grid superimposed on the loose octree to form a single data structure called a grid-based loose octree to represent spatial partitioning of the scene, wherein a size of each cell in the three dimensional grid is determined by multiplying the looseness value by the world size and dividing by two to the power of the minimum depth level.

8. The article of claim 7, further comprising creating a grid lookup table used to reference a selected node of the grid-based loose octree.

9. The article of claim 7, wherein subdividing the scene comprises uniformly subdividing the scene recursively.

10. The article of claim 7, wherein determining the looseness value comprises determining the looseness value such that objects of the scene do not straddle boundaries of octants of the scene.

11. The article of claim 10, wherein the octants overlap, the extent of the overlap determined by the looseness value.

12. The article of claim 7, wherein a node of the grid-based loose octree corresponds to an octant of the subdivided scene.

13. An article comprising a computer-readable medium encoded with a data structure defining a gnd-based loose octree having a root node and a plurality of child nodes, each node representing an octant of a scene, wherein a size of an octant is adjusted by a looseness value, at least one node of the grid-based loose octree is referenced by a cell of a three-dimensional grid uniformly subdividing the scene and superimposed on the grid-based loose octree, a size of each cell in the three superimposed on the grid-based loose octree, wherein a size of each cell in the three dimensional grid is determined by multiplying the looseness value by the world size and dividing by two to the power of a minimum depth level.

14. The article of claim 13, wherein each node includes at least one of a pointer to objects contained in the octant represented by the node, the octant's center, the octant's size, and a depth of the octant in the grid-based loose octree.

15. The article of claim 13, wherein octants may overlap, the extent of the overlap determined by the looseness value.

* * * * *